(12) United States Patent
Hewes et al.

(10) Patent No.: US 8,954,102 B2
(45) Date of Patent: *Feb. 10, 2015

(54) SYSTEM AND METHOD FOR DETERMINING AND DELIVERING APPROPRIATE MULTIMEDIA CONTENT TO DATA COMMUNICATION DEVICES

(71) Applicant: M-Qube, Inc., Watertown, MA (US)

(72) Inventors: Gerald Hewes, Lexington, MA (US); Eswar Priyadarshan, West Roxbuy, MA (US); Boon Hwang, San Rafael, CA (US); Randall A. Snyder, Redmond, WA (US)

(73) Assignee: Mobile Messenger Global, Inc., Los Angeles, CA (US)

( * ) Notice: Subject to any disclaimer, the term of this patent is extended or adjusted under 35 U.S.C. 154(b) by 0 days.
This patent is subject to a terminal disclaimer.

(21) Appl. No.: 14/158,609

(22) Filed: Jan. 17, 2014

(65) Prior Publication Data
US 2014/0135046 A1 May 15, 2014

Related U.S. Application Data

(63) Continuation of application No. 10/556,975, filed as application No. PCT/US2004/015729 on May 17, 2004, now Pat. No. 8,670,753.
(60) Provisional application No. 60/471,001, filed on May 16, 2003.

(51) Int. Cl.
*H04M 3/42* (2006.01)
*H04L 29/06* (2006.01)
(Continued)

(52) U.S. Cl.
CPC . *H04W 4/12* (2013.01); *H04W 4/18* (2013.01); *H04W 8/18* (2013.01); *H04W 8/22* (2013.01); *H04W 88/184* (2013.01)
USPC ..................... 455/466; 455/414.1; 455/414.4; 455/412.1; 455/414.3; 709/206; 379/88.11; 379/88.14

(58) Field of Classification Search
CPC ...................... H04L 29/06027; H04L 67/2823
USPC ......... 455/414.4, 466, 412.1, 414.1; 709/206; 379/88.14, 88.11
See application file for complete search history.

(56) References Cited

U.S. PATENT DOCUMENTS 5,559,860 A 9/1996 Mizikovsky
6,272,530 B1 * 8/2001 Horiuchi et al. .............. 709/206
(Continued)

OTHER PUBLICATIONS

International Search Report, International Application No. PCT/US2004/015729 mailing date Oct. 8, 2004.

*Primary Examiner* — Jinsong Hu
*Assistant Examiner* — Dung Hong
(74) *Attorney, Agent, or Firm* — Arent Fox LLP

(57) ABSTRACT

Provided herein are exemplary techniques for determining and delivering, appropriate multimedia content comprising a combination of text, images, sounds, rich-text, animation, video, etc. to personal data communication devices (107), such as wireless cell-phones or wireless PDA's, based upon device specific information such as the network protocol used by the device, the network provider, the device capabilities (110), the current state of the device, user specified settings, etc. An application server (109) contains an interpreter capable of executing a set of instructions to manage the delivery and receipt of appropriate multimedia and simple text content to and from personal communication devices (107). Appropriate content (104) is sent to the personal data communication device (107) based on the network protocol used by the device, the network provider, the device capabilities, the current state of the device and user specified settings under the control of the interpreter. A plurality of device capability input handlers (108) controlled by the interpreter is used to capture the device capability of the personal data communication device (107).

9 Claims, 8 Drawing Sheets

(51) Int. Cl.
*H04L 29/08* (2006.01)
*H04M 1/725* (2006.01)
*H04W 4/00* (2009.01)
*G06F 15/16* (2006.01)
*H04M 1/64* (2006.01)
*H04M 11/00* (2006.01)
*H04W 4/12* (2009.01)
*H04W 4/18* (2009.01)
*H04W 8/18* (2009.01)
*H04W 8/22* (2009.01)
*H04W 88/18* (2009.01)

(56) References Cited

U.S. PATENT DOCUMENTS

| | | |
|---|---|---|
| 7,284,046 B1 * | 10/2007 | Kreiner et al. .............. 709/223 |
| 2001/0010685 A1 | 8/2001 | Aho |
| 2002/0059362 A1 * | 5/2002 | Maeda ..................... 709/203 |
| 2002/0078253 A1 * | 6/2002 | Szondy et al. ............. 709/315 |
| 2002/0156833 A1 * | 10/2002 | Maurya et al. ............. 709/203 |
| 2002/0160757 A1 * | 10/2002 | Shavit et al. ............... 455/414 |
| 2003/0050062 A1 | 3/2003 | Chen et al. |
| 2003/0110234 A1 | 6/2003 | Egli et al. |
| 2003/0186722 A1 | 10/2003 | Weiner |
| 2003/0236892 A1 * | 12/2003 | Coulombe .................. 709/228 |
| 2004/0181550 A1 * | 9/2004 | Warsta et al. ............. 707/104.1 |

* cited by examiner

SYSTEM AND METHOD FOR DETERMINING AND DELIVERING APPROPRIATE MULTIMEDIA CONTENT TO DATA COMMUNICATION DEVICES

CROSS-REFERENCE TO RELATED APPLICATION

This application is a Continuation of U.S. application Ser. No. 10/556,975, filed Jan. 22, 2009, which is the U.S. National Stage entry of International Application No. PCT/US2004/015729, having an international filing date of May 17, 2004, which claims priority to U.S. Provisional Application No. 60/471,001, filed May 16, 2003. The disclosures of each of these applications are hereby incorporated in their entirety by reference.

STATEMENT REGARDING FEDERALLY SPONSORED RESEARCH OR DEVELOPMENT

Not applicable

REFERENCE OF A "MICROFICHE APPENDIX"

Not applicable

FIELD OF THE INVENTION

This invention relates generally to messaging systems and methods.

BACKGROUND

With the rise of personal data communication devices such as data enabled cell phones supporting the Short Message Service ("SMS") and the Multimedia Messaging Service ("MMS"), wireless Personal Digital Assistant's ("PDA"), personalized Instant Messaging ("IM") and e-mail clients, there exists an acute need for organizations to execute multimedia application based two way communications. Particularly, there is a need for rich multimedia based communications that deliver the right content based on the personal data communication device multimedia capabilities and its current state using a single platform.

The mobile space is very fragmented when it comes to the multimedia capabilities of mobile devices, primarily because of the processing constraints on these devices and the large number of manufacturers in this space. Therefore, it is very difficult to create mobile applications across disparate devices. In addition, there is no simple answer to the question of how to acquire information on the capabilities of a mobile device in order to optimize the content delivered to the mobile device, especially if all the mobile application knows is the mobile device phone number, e-mail address or IM screen name. By optimized content, we mean delivering sounds using the best format the mobile device supports, or delivering images using the best resolution with the most functional format. The logic to acquire the capabilities of the mobile device has to be application specific. Even a task as simple as delivering a ringtone purchased by a user on a web site can be daunting since it may require the user to identify his device, not always an easy task, prior to even beginning the purchase process, for the right ringtone to be selected.

Illustrative examples of applications that benefit from this invention include: creating quiz and trivia applications to promote movies where ringtones and images are delivered as part of the application; delivering images of major moments in a game; mobile blog applications where users send in pictures taken with their mobile device.

Existing systems to capture device capability and to deliver multimedia content either perform their operations automatically with no possibility to customize the rendering based on the application (for example trans-coding images to the right size and right format based on the detected device) or these operations have to be custom programmed by a qualified programmer using professional programming languages such as Java or C#. Neither approach is well suited to letting an application designer develop a dialog such as:

If we know the user can receive an image on his device then send him an image;

If not, send a text message asking the user if his device can handle images;

Store the user response in the device capability repository for use in future communications;

If the user responded yes to the image question, send him an image; otherwise send him an alternative text message.

The present invention enables anyone familiar with simple scripting languages, not just skilled programmers, to develop these kinds of application specific algorithms.

This invention, by making use of a multimedia enabled interpreter that can be programmed by a on programmer permits the development and deployment of high usability multimedia rich programs across a wide range of devices in a cost effective and time efficient manner.

Another problem a mobile application platform needs to address is making sure the device capabilities collected are still up-to date. Hence device capabilities needs to be sent on a regular basis to the device capability repository and the data kept current. If error conditions are detected, they need to be handled and retry logic performed. This is again better handled by having a scriptable interpreter that can be programmed with application specific knowledge.

Confirmation of delivery of multimedia is also often available, for example, when a user downloads a purchased ringtone. The interpreter that is described in this invention can programmatically respond to this confirmation, and more critically, can set timers that respond from not receiving download or delivery confirmation in a given time frame. For example, a common technique in the mobile space is to push a Wireless Application Protocol ("WAP") Uniform Resource Location ("URL") to a phone. But there are many reasons why this may fail, based on the user handset, the carriers, the subscriber service plan, the subscriber identity module ("SIM"). This invention allows the development of applications where the designer of the application can execute an alternative flow if the user does not download the page in a specific time frame, and for example, fall back on the more universally available SMS text messaging capabilities of the user handset. The text in the SMS message could then guide the user to access manually a specified mobile site that contains the data the user desired to download.

The same application design framework is used to create rich dialogs regardless of the message network used by the personal data communication device. This includes such diverse family of protocols such as SMS, MMS, e-mail, Multipurpose Internet Mail Extensions ("MIME") enabled e-mail, IM, applications, etc.

Multimedia dialogs can be further created using a simple to use Graphical User Interface ("GUI") design tool or directly via an XML based language. Different content can be specified using a declarative approach that is simple to understand by non-programmers.

This invention addresses many of the limitations of existing systems in one integrated system.

SUMMARY DESCRIPTION OF THE INVENTION

Figure 1:
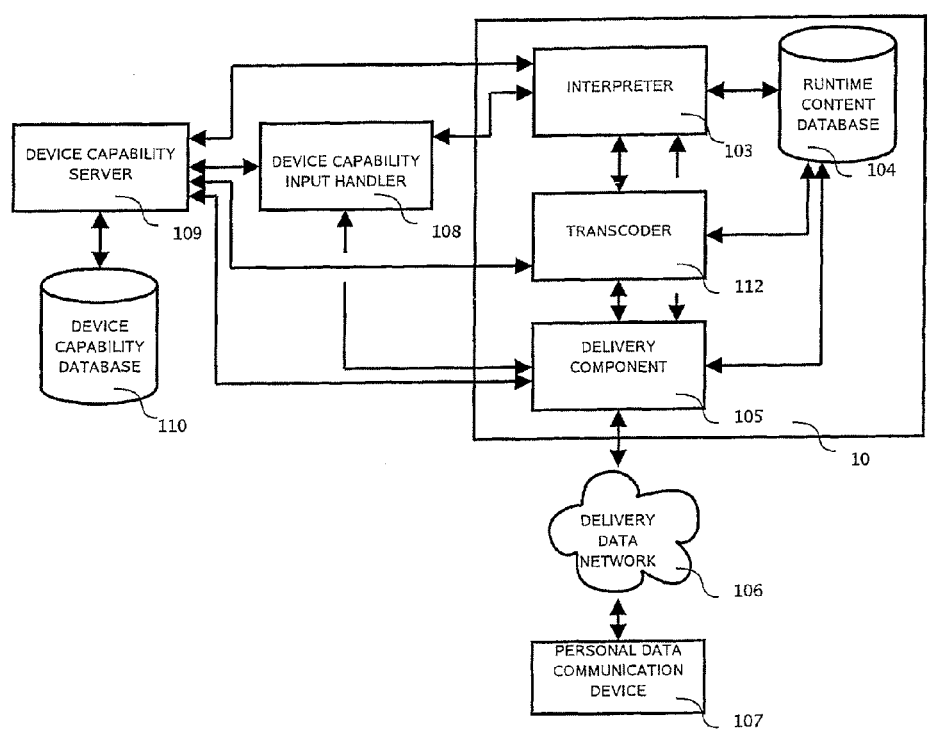
FIG. 1 is an exemplary embodiment of a system constructed in accordance with the teachings expressed herein.

The present invention facilitates the development of multimedia applications targeting personal data communication devices using an application server containing a scriptable interpreter. More particularly, the present invention comprises the following features: 1) the ability to design applications once using the same application editing tool and the same representation for applications instructions that can be carried out using simple text based devices or multimedia capable devices, 2) an application server capable of executing the applications, 3) a repository of device capabilities that is queried by the application server, 4) a plurality of device capability input handlers whose responsibility is to build up the repository of device capabilities, and 4) delivery components capable of detecting which type of multimedia content to forward to a user personal communicator device and transcode the content as appropriate.

Thus, in accordance with one aspect of the present invention, there is provided a method and apparatus for executing multimedia and text based dialogs between a message application server and personal data communication devices by means of a dialog interpreter. The method comprises: 1) designing a single set of dialog instructions capable of supporting any personal communication device; 2) querying a device capability server for the device capability of a particular personal communication device by means of the device address; 3) generating and executing an appropriate dialog instruction in a message application server; and 4) delivering messages to the personal communication device by means of a delivery component; whereby the appropriate multimedia message is delivered to the personal data communication device.

In accordance with another aspect of the present invention the step of capturing the personal data communication devices multimedia capabilities and storing them in the device capability database is managed by a device capability server.

In accordance with another aspect of the present invention the capabilities of the personal data communication device are captured as follows: outside the dialog and before the dialog is started; at the start of the dialog; during the dialog; and/or at the end of the dialog.

In accordance with another aspect of the present invention, the dialog instructions includes capturing the personal data communication device capabilities.

In accordance with another aspect of the present invention, in delivering the messages to the personal communication device the multimedia content is adapted based on the network and protocols used by the personal communication device, the device current state and user specified preferences.

In accordance with another aspect of the present invention, the multimedia content is adapted by filtering out content or substituting the content with other content (for example, text instead of an image) based on the network and protocols used by the personal communication device, the device current state and user specified preferences.

In accordance with another aspect of the present invention, the multimedia content is adapted by transforming the multimedia contents from one format to another based on the network and protocols used by the personal communication device, the device current state and user specified preferences (for example, changing the format used to represent an image, or changing its size, or the number of color used, or picking out an image among many that better fits the device).

In accordance with another aspect of the present invention, content is sent to the personal communication device is affected by the device current state (for example less rich content for mobile AIM versus desktop AIM.)

In accordance with another aspect of the present invention, a data network supporting presence is queried for presence of the personal communication device for selecting which content to forward to the personal communication device.

In accordance with another aspect of the present invention, the protocol used for querying the presence is SIP or any other presence protocol.

In accordance with another aspect of the present invention, the personal data communication device is selected from the following non-exhaustive list of devices:

A cell phone supporting text based messaging (such as SMS);

A cell phone supporting multimedia based messaging (such as enhanced device specific SMS based protocols, EMS, MMS);

A data connected PDA supporting a message based protocol;

Any computing device supporting a combination of the SMTP, POP and IMAP protocols or any substantially similar e-mail protocols;

Any computing device supporting a combination of the SMTP, POP and IMAP protocols or any substantially similar e-mail protocols with MIME support;

Any computing device supporting an instant messaging protocol (for example AOL Instant Messaging, MSN Messenger, Yahoo messenger, Jabber based instant messengers or any other substantially similar instant messaging solution);

Any computing device capable of executing programmed instructions and equipped with a data network whereby the computing device can be programmed as a communication device—examples of such computing device are Java 2 Mobile Edition ("J2ME"), Binary Runtime Environment for Wireless ("BREW"), Symbian, Linux, Windows based devices or any substantially similar operating platforms.

In accordance with another aspect of the present invention, multimedia content is retrieved from a runtime content database.

In accordance with another aspect of the present invention, the multimedia content for a dialog is stored in multiple formats to support multiple personal data communication devices.

In accordance with another aspect of the present invention, the personal data communication device multimedia capabilities is captured by means of one or more device capability input handlers.

In accordance with another aspect of the present invention, the device capability input handlers may be implemented, for example, as follows:

a web site that asks the users to select his device and enter his device capability;

a device probe capable of detecting the device and its capabilities from information sent by or queried by the device probe. For example by extracting device information from a WAP page or an HTML web site;

by sending some message to the device that triggers a response that provides additional information on the device capabilities;

device information and capability is provided by the network provider when user purchases or registers his device;

captured by running a series of dialogs or test messages where the user is sent multiple messages and the user responds to the successful messages.

by querying an external device capability database managed by a third party with similar purposes to the one described in this invention.

In accordance with another aspect of the present invention, additional device capability information is captured during execution of dialog instructions.

In accordance with another aspect of the present invention, one or more device capability input handlers may be used to acquire device capability information during execution of dialog instructions.

In accordance with another aspect of the present invention, the step of designing a set of dialog instructions is represented by a multimedia enabled instructions set.

In accordance with another aspect of the present invention, the multimedia instruction set may be implemented using, for example, the following:

a text oriented language;

a markup language such as XML; or a binary instruction set.

In accordance with another aspect of the present invention, the design of the set of dialog instructions is accomplished by means of a multimedia enabled graphical dialog editor.

In accordance with another aspect of the present invention, the step of executing the dialog instructions is augmented by the capability of executing different instructions based on the personal data communication device capabilities.

In accordance with another aspect of the present invention, the step of executing the dialog instructions is augmented by the capability of detecting delivery errors due to detected incompatibilities between what was known of the device capability and the current device capability whereby the device capability repository is updated and the dialog is transparently resumed using a more common representation (for example dropping from MMS to SMS.) or after asking for additional data from the user.

In accordance with another aspect of the present invention, multimedia peer-to-peer message exchanges are accomplished through the message application server which is programmed to change, filter, adapt or enhance the messages.

In accordance with another aspect of the present invention, the multimedia content includes but is not limited to:

text rich text (Rich Text Format ("RTF"), HTML, . . . ), non Latin character sets, . . .

special characters (e.g. smilies, dingbats . . . )

images (PNG, JPG, WBMP, . . . )

vector illustrations (SVG, etc. . . . )

sounds/Music/Speech (.MP3, .WAV, .AU, .OGG, . . . )

animations vector Animation (Flash, SVG, Sharp Motion ART (SMART), SMIL, SVG, . . . )

video clips (MPEG-4, RealVideo, Windows Media, . . . )

In accordance with another aspect of the present invention, the protocol used by the device can be different for device terminated messages and device oriented messages.

In accordance with another aspect of the present invention, the message terminated and message originating address used by the device uses the same device address (for example receive MMS message on a cell phone and reply with SMS where the address is a phone number, or receive HTML based e-mails but reply with text only e-mails where the address is an e-mail address)

In accordance with another aspect of the present invention, the device capability repository is not co-located with the content delivery or dialog platform.

In accordance with another aspect of the present invention, the device capability server is connected to the content delivery or dialog platform by means of a data network.

In accordance with another aspect of the present invention, the protocol used between the device capability repository and the content delivery or dialog platform is one of the following protocols:

SOAP

LDAP

DNS/ENUM like query

Raw Socket (over TCP/IP or UDP for example)

DETAILED DESCRIPTION OF THE INVENTION

Aspects, features and advantages of several exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

Referring to FIG. 1, an exemplary system constructed in accordance with the teachings expressed herein comprises the following components: an interpreter (103); a runtime content database (104); a transcoder (112); a delivery component (105); a delivery data network (106); a personal data communication device (107); a plurality of device capability input handlers (108); a device capability server (109); and a device capability database (110). The interpreter (103), the transcoder (112), the delivery component (105) and the runtime content database (104) constitute an application server 10.

The components are described as a single unit, but can be implemented as a cluster of units operating as a whole. The techniques to implement a service in a cluster are well known to those of skill in the art.

In one exemplary embodiment, the device capability input handler(s) (108) acquire device capabilities of the personal data communication devices (107). In one exemplary embodiment, a plurality of device capability input handlers (108) are available. Illustrative examples include, but is not limited to, asking users about their personal data communication device capabilities; extracting detailed device capabilities from WAP headers using standards such as Composite Capabilities/Preferences Profile ("CC/PP") or User Agent Profile ("UAProf".) In one exemplary embodiment, the interpreter (103) has programmatic control of which device capability input handler (108) to use and when.

The device capability server (109) is accessible by any component including, but not limited to, by the interpreter (103), the transcoder (112) and the device capability input handler(s) (108). The device capability server (109) is not necessarily co-located with other components but may be also connected to a data network, such as the Internet. The device capability server (109) may be connected to a plurality of application servers (10) and function in a centralized manner. The device capability server (109) supports interfaces to query for device capabilities as well as interfaces to update device capabilities. The device capability server (109) stores device capabilities in the device capability database (110.) Each personal data communication device (107) is uniquely identified by an identifier, which is used as a primary key into the device capability database (110). In one exemplary embodiment, the primary key into the device capability database (110) is the identifier and the personal data communication device (107) state. As an illustrative example, a personal data communication device (107) capability may be different depending on the available bandwidth of the delivery data network (106).

The device capability server (109) query interface may be implemented using various protocols including the Lightweight Directory Access Protocol ("LDAP"), the TCP/IP Socket Protocol, any of the many Remote Procedure Call ("RPC") protocols, Simple Object Access Protocol ("SOAP"), a protocol similar to that of the protocol used by ENUM to retrieve properties on a phone number, an application programming interface ("API"), or any suitable protocol. In one preferred embodiment the device capability database (110) is accessed through the device capability server (109). In another preferred embodiment, the device capability database (110) is accessed directly.

The interpreter (103) is any system capable of executing programmed instructions. In one exemplary embodiment, the interpreter (103) is implemented as an interpreter. In one exemplary embodiment, the interpreter (103) instructions are compiled into a byte code, which is then interpreted or compiled just-in-time using a virtual machine. Illustrative examples include the Java Virtual Machine ("JVM"), the .NET/Mono Common Language Runtime ("CLR") or any substantially similar system. In one exemplary embodiment, the interpreter (103) instructions are compiled directly to machine code to be executed by a CPU.

In one embodiment the interpreter (103), contains instructions to send multimedia content.

In one exemplary implementation, the instructions are implemented as XML tags as follows:

```
<send><text>Text Message</text></send>
<send><img src="image.png"></img></send>
<send><img src="image" transcode="false"></send>
<send><img src="image_big.png" min-size="640x480" min-color-depth="8bit"/></send>
<send><img src="image_small.png" size="128x128" depth="8bit"/>
</img></send>
```

The first instruction sends a text message. The second instruction sends image "image.png" using the platform automatic transcoding capabilities. The third instruction sends an image "image.png" as is with no transcoding. The third instruction sends image "image_big.png" if the personal data communication device (107) can display images larger than 640×480 in more that 256 color (8 bit). The forth instruction forces sending image "image_big.png" in 640×480 pixels and 256 color irrespective of the personal data communication device (107) capabilities.

The above exemplary implementation illustrated instructions to deliver an image to the personal data communication device (107). Similar instructions and attributes exist for other media types like sound.

In one exemplary embodiment, the interpreter (103) contains instructions to query the device capability for a given personal data communication device (107). The interpreter (103), can then use its general purpose instructions, like conditional logic, to send different content to different personal data communication devices (107). As an illustrative example, the following instructions could test the personal data communication device color capabilities:

```
<if cond="device.colorCapable eq true">
    <send><text>Your device has color</text></send>
<else/>
    <send><text>Your cannot handle color</text></send>
</if>
```

In one exemplary embodiment, the interpreter (103) contains support to control which device capability input handler (108) is used. As an illustrative example, the interpreter (103) could push a WAP page to a user cell phone, where the destination wap page can capture the device capability of the user cell phone:

```
<if cond="device.haveCapability eq false">
    <wap url="http://www.m-qube.com/dev-cap.wml/">
</if>
```

In one exemplary embodiment, the interpreter (103) instructions are based on a mark-up language, such as Extensible Mark-up Language ("XML") or a variation thereof. By using a text based representation it is possible to adopt a web based architecture where the application instructions can be dynamically generated by a web application allowing for powerful integration capabilities.

The runtime content database (104) stores the multimedia content required by an application. The multimedia content can be of multiple types and in multiple formats and resolutions. In one exemplary embodiment, the runtime content database (104) is connected to the interpreter (103), the transcoder (112) and the delivery component (105).

In one exemplary embodiment, the transcoder (112) trans-code content by making use of the personal data communication device (107) capabilities retrieved in the device capability server (109). In one exemplary embodiment, the transcoder (112) trans-code content by making use of the personal data communication device (107) capabilities retrieved in the device capability server (109), the delivery data network (106), the personal data communication device (107) state, users preferences and the available formats stored in the runtime content database (104). The user preference being stored in a user preference database (130).

In one exemplary embodiment, the system supports several types of multimedia content including, but not limited to the following: text; rich text (RTF, HTML, . . . ); special characters (e.g. smilies, dingbats . . . ), non Latin character sets; Images (PNG, JPG, WBMP, . . . ); vector illustrations (Scalable Vector Graphics ("SVG"), . . . ); sounds/music/speech (.MP3, .WAV, .AU, .OGG, AAC . . . ); animations; vector animation (Macromedia Flash™, SVG, Sharp Motionart™, SMIL, . . . ); video (MPEG-4, Real™, QuickTime™, Windows Media™, . . . ); content references: URL.

In one exemplary implementation the transcoder (112) is programmed to substitute missing the personal data communication device functionality by other functionality, for example, simulating animations and sequences in the transcoder (112) if the device cannot understand the animation directly.

In one exemplary implementation the transcoder (112) is programmed to perform character set conversion.

In one exemplary embodiment, the delivery component (105) delivers messages to the personal data communication device(s) (107). The delivery component (105) is responsible for the delivery of messages created in the interpreter (103) to the personal data communication device(s) (107). The delivery component (105) is connected to a plurality of delivery data network(s) (106), and is capable of routing the messages to the appropriate delivery data network (106). In an exemplary embodiment, the routing is based on the personal communication device (107) address, and the service address of the application. Various alternative routing embodiments will be known to those of skill in the art. The delivery component (105) is also responsible for accepting messages from the delivery data network(s) (106) and delivering them to the interpreter (103) for processing. The delivery component (105) may also have additional responsibilities such as buffering messages between the delivery data network(s) (106) and the interpreter (103) to handle differences in message processing speeds.

In one exemplary embodiment, the delivery component (105) supports short message service ("SMS"), Enhanced Messaging System ("EMS"), multimedia messaging service ("MMS"), e-mail (simple mail transport protocol "SMTP"), Multipurpose Internet Mail Extensions ("MIME") enabled e-mail, eXtensible Messaging and Presence Protocol ("XMPP"), Instant Messaging and any other substantially similar messaging protocols.

In one exemplary embodiment, the delivery component (105) is programmed to accept incoming content, which if device capabilities is associated with the content, is forwarded to the device capability server (109).

The delivery data network (106) communicatively connects the personal data communication device(s) (107) with the various components of the system. The specific implementation details of the delivery data network (106) vary according to the personal communication devices (107) and the networking technology employed. The various implementations are well known to those of skill in the art and will therefore not be discussed further herein.

The personal data communication device (107) includes all data communication devices, such as, for example, mobile/cell devices, network enabled PDA's and various other network enabled computing devices.

Figure 2:
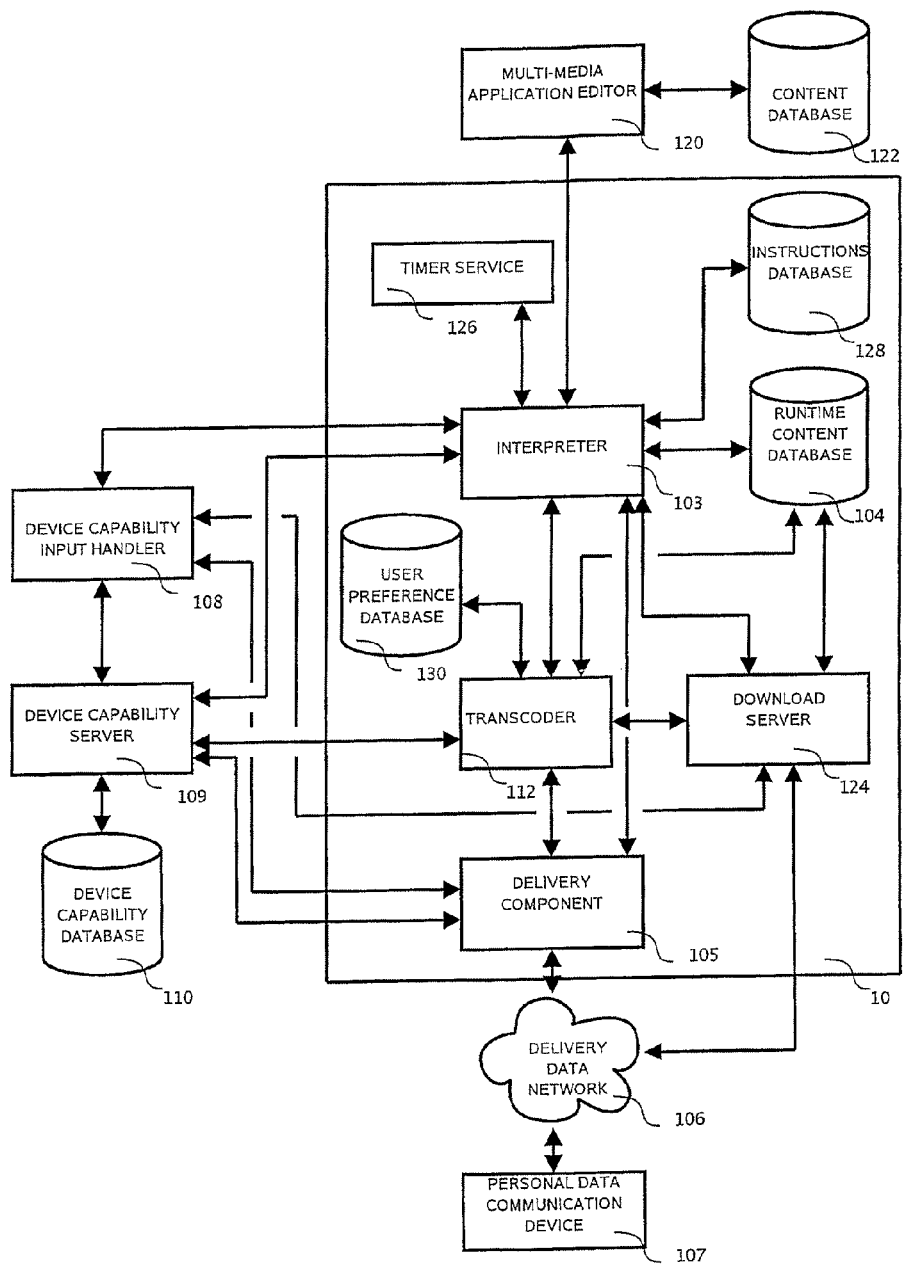
FIG. 2 is an exemplary embodiment of a system constructed in accordance with the teachings expressed herein containing additional components.

Referring to FIG. 2, an exemplary system constructed in accordance with the teachings expressed herein further comprises the following components: a multimedia application editor (120) and a content database (122).

The multimedia application editor (120) is a WYSWYG editor enabling non-programmers to develop multimedia enabled applications. The multimedia editor (120) being programmed to generate application instructions for execution by the interpreter (103). The content database (122) being used by the multimedia editor (120) to store multimedia content. In one exemplary embodiment the runtime content database (104) is the same as the content database (122). In another embodiment, the content of the content database (122) for a particular application is copied over to the runtime content database (104) when the application is executed.

The content database (122) stores the multimedia content that is part of the dialog during the design and edit phase of the dialog. This invention is capable of storing multimedia content of multiple type and in multiple format and resolution.

Referring to FIG. 2, an exemplary system constructed in accordance with the teachings expressed herein further comprises the following components: a download server (124) connected to the runtime content database (104). The download server (124) is used in an exemplary implementation where multimedia content is not pushed out to the personal data communication device (107) directly by means of the delivery component (105), but instead a reference to the multimedia content is pushed to the personal data communication device (107), and the personal data communication device (107) then retrieves the multimedia content by means of the reference. The download server (124) is connected to the interpreter (103) for purpose of notifying the interpreter (103) of the multimedia content download.

In one exemplary embodiment the download server (124) renders the multimedia content identified by the reference using the personal data communication device (107) device capabilities as retrieved from the device capability server (109).

In one exemplary embodiment, the download server (124) is programmed to accept uploaded content originated from the personal data communication device (107), and to store the content in the runtime content database (104), to generate a unique content identifier, and to forward the unique identifier to the interpreter (103).

Referring to FIG. 2, an exemplary system constructed in accordance with the teachings expressed herein further comprises the following components: a timer service (126) connected to the dialog interpreter. The timer service (126) can be used to notify the interpreter (103) that a certain amount of time has elapsed since an event. A typical use of the timer server (126) in the context of this invention is to start a timer when some content is sent to a personal data communication device (107). In one exemplary embodiment, the multimedia content is sent directly by means of the delivery component (105), and a delivery receipt is sent back via the data network (106) to the delivery component (105), that forwards to the interpreter (103). If the timer set in the timer service (126) expires prior to receiving the delivery receipt, then the interpreter (103) can execute programmed instructions that handle the case when the system assumes the content was not correctly received by the personal data communication device (107). In one exemplary embodiment, the multimedia content is sent by reference by the delivery component (105) to the personal data communication device (107). When the personal data communication device (107) retrieves the content from the download server (124), the download server (124) notifies the interpreter (103). If the timer set in the timer service (126) expires prior to receiving the delivery receipt, then the interpreter (103) can execute programmed instructions that handle the case when the system assumes the content was not correctly received by the personal data communication device (107).

In one exemplary implementation of the invention, an instruction database (128) is connected to the interpreter (103) for the purpose of storing the application instructions.

Figure 3:
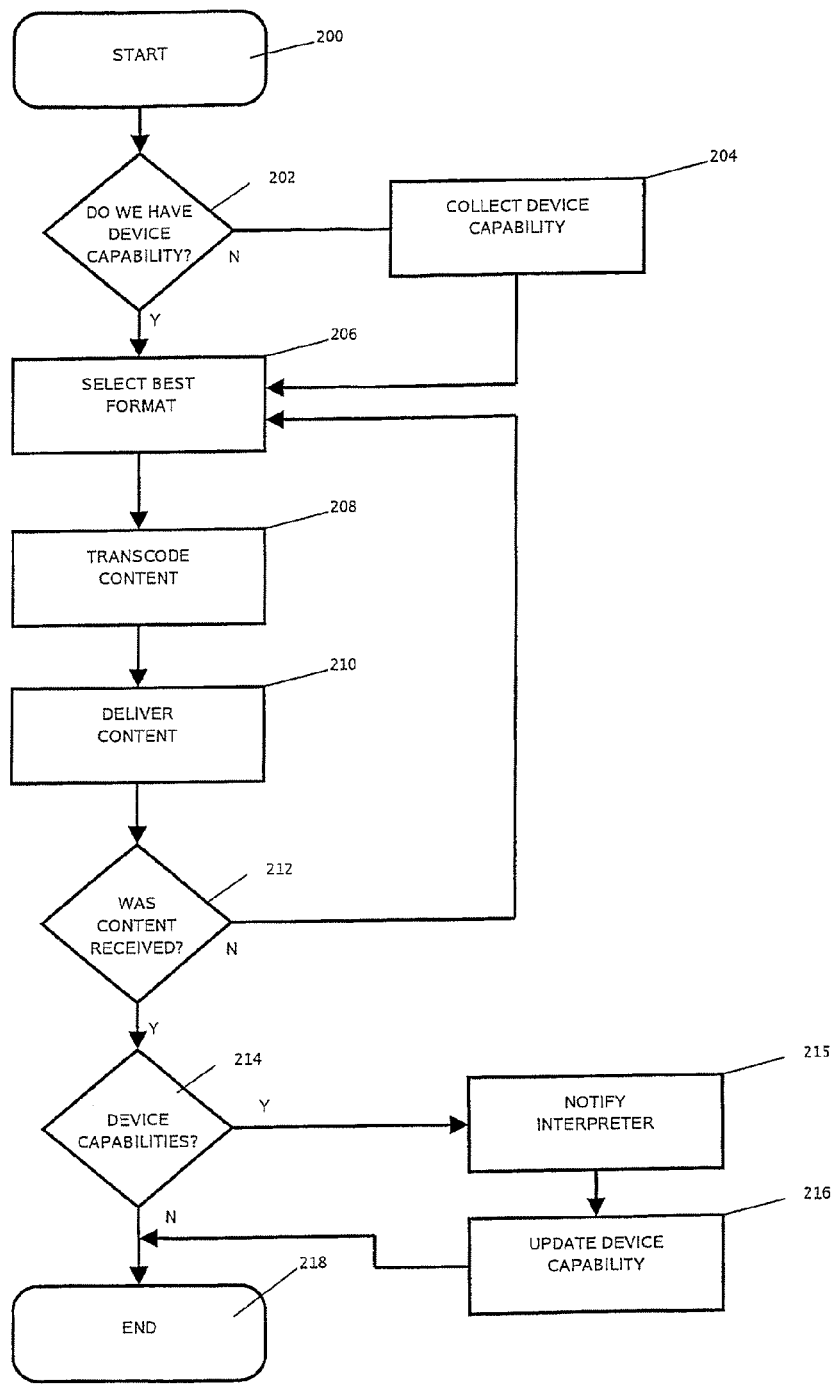
FIG. 3 is a flow chart illustrating an exemplary algorithmic embodiment used to send multimedia content to a data communication device.

Referring to FIG. 3, there is shown a flow chart of an exemplary implementation of an application sending multimedia content to a personal data communication device (107), developed using the present invention. In step 202, the application is programmed to test if the system already has device capabilities for the personal data communication device (107). If not the application is programmed to collect the device capabilities in step 204. If yes, the transcoder (112) selects the best content format in step 206. The original content is transformed by the transcoder (112) into the best content format in step 208. The transformed content is then delivered to the personal data communication device (107) in step 210. If a delivery receipt is not received after a certain time, the application can try another format in step 212 or execute any appropriate logic programmed by the application. If the multimedia content was received and additional device capabilities was captured about the personal data communication device (107) in step 214, the additional device capabilities is forwarded to the interpreter (103) in step 215, where the application can be programmed to update the personal data communication device (107) capabilities in the device capability server (109) in step 216.

Figure 4:
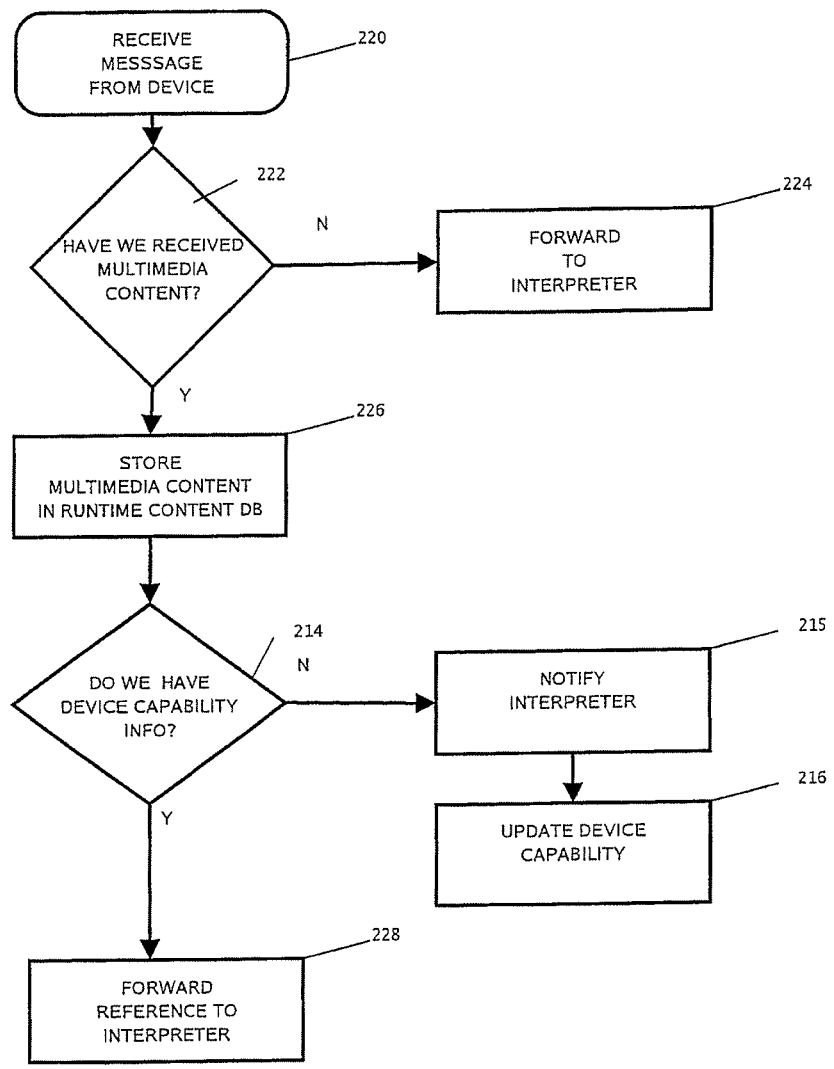
FIG. 4 is a flow chart illustrating an exemplary algorithmic embodiment used to receive multimedia content from a data communication device.

Referring to FIG. 4, there is shown a flow chart of an exemplary implementation of an application receiving content from a personal data communication device (107), developed using the present invention. The delivery component (105) receives the message from the personal data communication device (107) in step 222. If the message has no multimedia component it is forwarded as is to the interpreter (103) in step 224. If the message has multimedia content, these are stored in the runtime content database (104). If the message includes additional device capabilities on the personal data communication device (107) in step 214, the additional device capabilities are forwarded to the interpreter (103) in step 215, where the application can be programmed to update the personal data communication device (107) capabilities in the device capability server (109) in step 216. The message, and references to all multimedia content embedded in the message are forwarded to the interpreter (103) in step 228.

Figure 5:
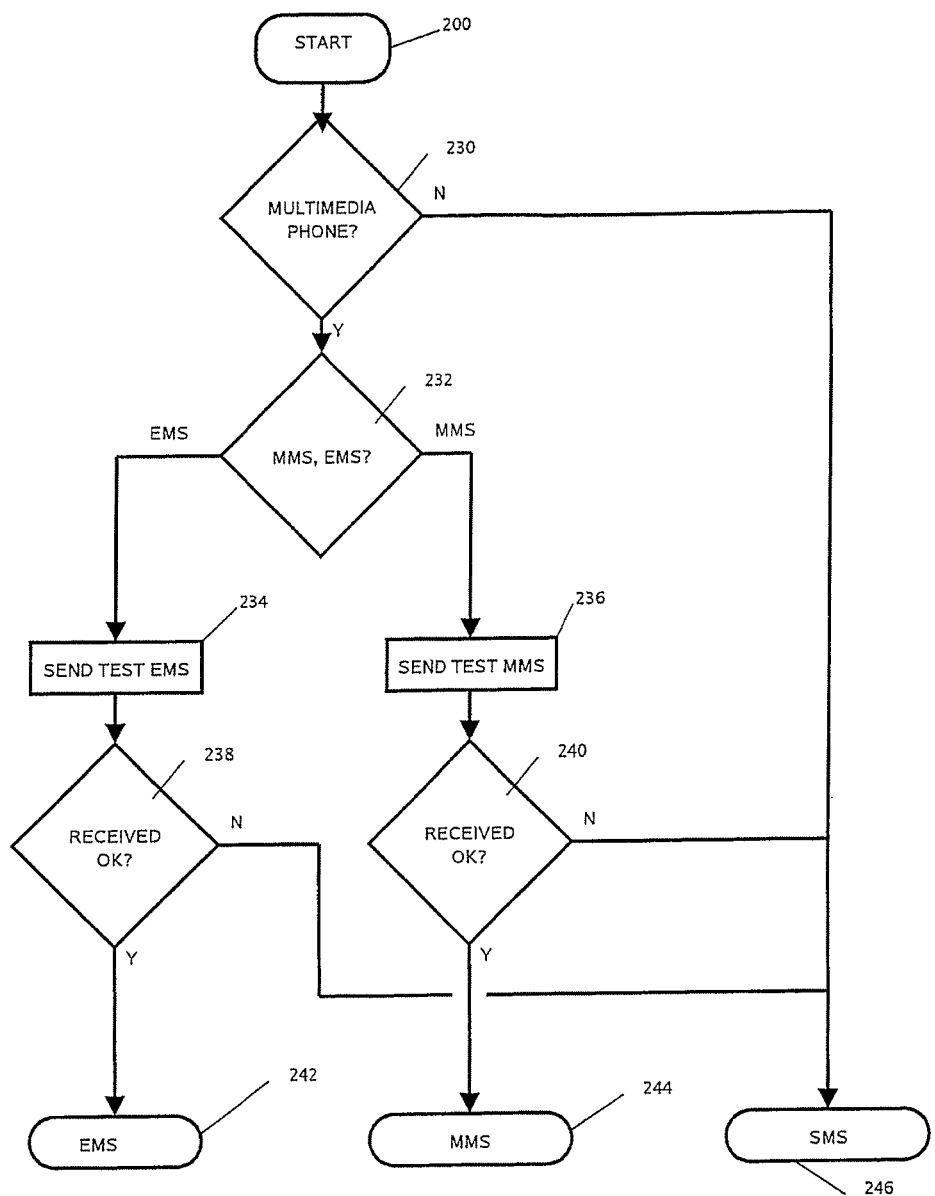
FIG. 5 is an exemplary embodiment of a dialog that can be used to determine certain device capabilities by asking a user questions.

Referring to FIG. 5, there is shown a flow chart of an exemplary application that uses the present implementation to gather the device capabilities of a personal data communication device (107). The application first asks the user using SMS, if her personal data communication device (107) supports multimedia content in step 230. If the user responds negatively, the application sets the device capability to SMS in step 246. If the user responds positively, the application then asks the user if her personal data communication device (107) support MMS or EMS in step 232. If the user responds EMS in step 232, the application sends a test EMS message in step 234. The user is then asked if she received the EMS test message correctly in step 238. If the user responds yes, the application sets the device capability to EMS in step 242, if not to SMS in step 246. If the user responds MMS in step 232, the application sends a test MMS message in step 236. The user is then asked if she received the test MMS message correctly in step 240. If the user responds yes, the application sets the device capability to MMS in step 244, if not to SMS in step 246.

Figure 6:
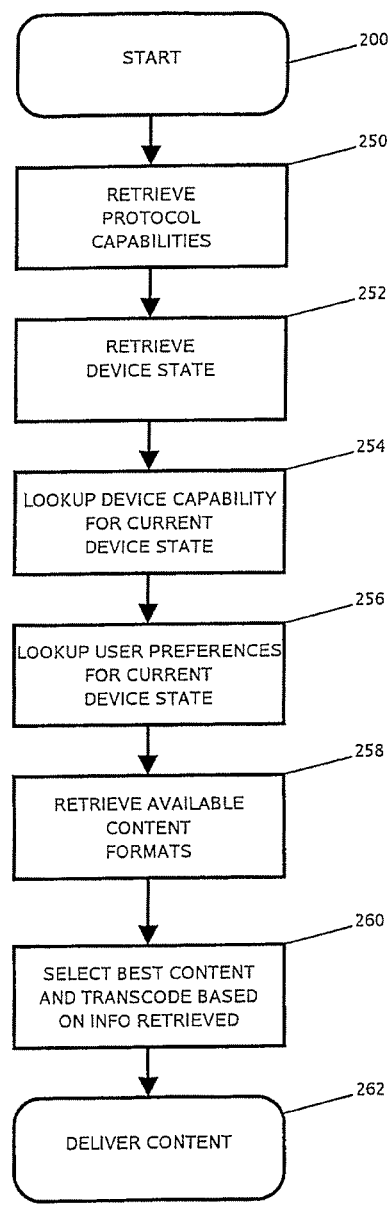
FIG. 6 is an exemplary embodiment of the logic of selecting the most appropriate multimedia content.

Referring to FIG. 6, there is shown a flow chart of an exemplary logic to select the best content to send to a personal data communication device (107). In step 250, the transcoder (112) retrieves the protocol capabilities of the delivery data network (106). In Step 252, the transcoder (112) retrieves the personal data communication device (107) state. In step 254, the transcoder (112) retrieves the personal data communication device capabilities (107). In step 256, the transcoder (112) looks up the personal data communication device (107) user preferences, which can be in an exemplary implementation dependent on the personal data communication device (107) state. In step 258, the transcoder (112) retrieves the list of formats under which the content is available. In step 260, the transcoder (112) selects the best content and transcodes the best content if necessary, to create the optimized content for the personal data communication device (107) based on all the retrieved information. In step 262, the optimized content is delivered to the personal data communication device (107). Other exemplary implementations are possible, in particular the order of step 250, 252, 254, 256 and 258 may be changed, and any of these steps can be eliminated from the flow if not required.

Figure 7:
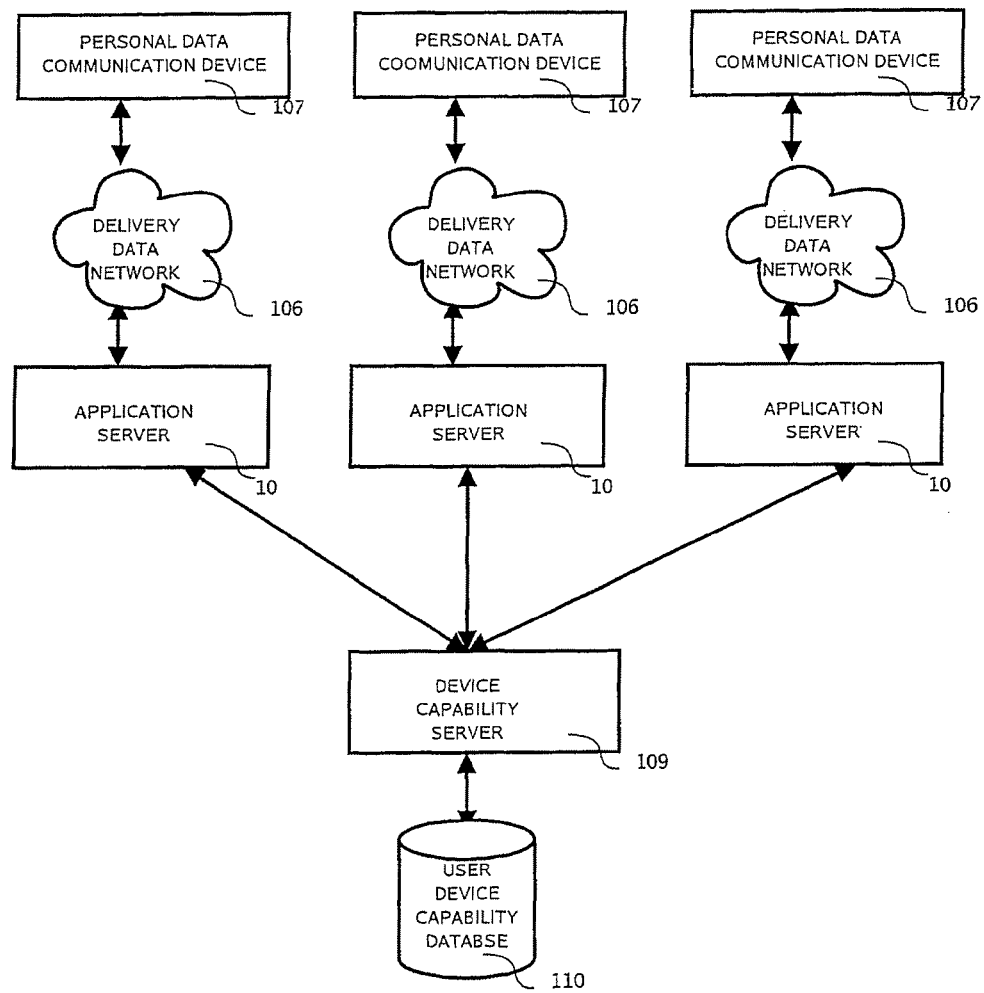
FIG. 7 is an exemplary embodiment illustrating the use of a centralized device capability server.
Figure 8:
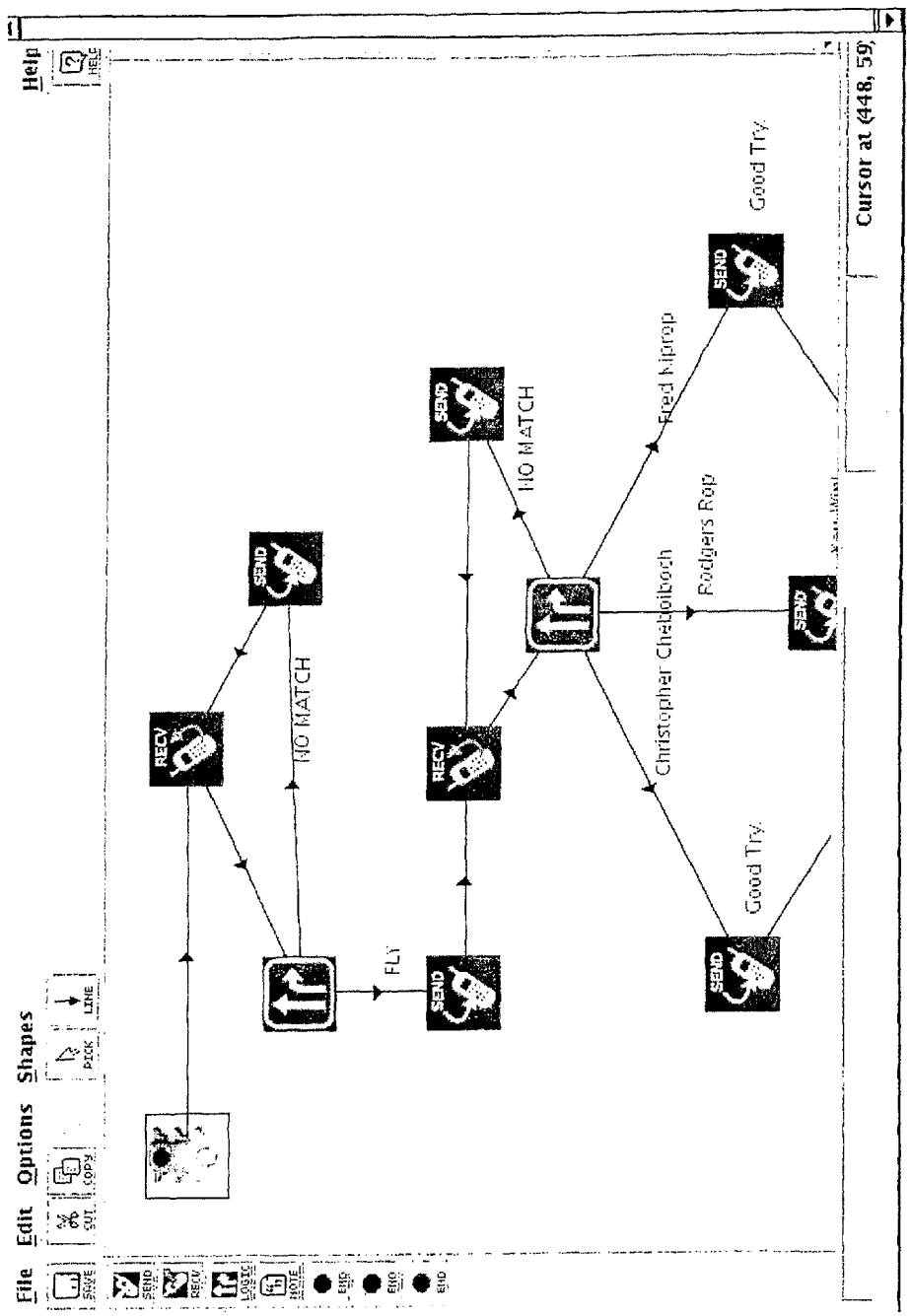
FIG. 8 is an exemplary embodiment of a Graphical Application Editor.

Referring to FIG. 7, an exemplary system constructed in accordance with the teachings expressed herein, illustrates the sharing of the device capability server (109), and its attached device capability database (110) by a plurality of application servers (10). The application servers can either be similar to the one described in this invention and consisting of a minimum of the interpreter (103), the runtime content database (104), the transcoder (112) and the delivery component (105), or any other application server capable of implement messaging application as described in this invention.

CONCLUSION

Having now described one or more exemplary embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the techniques may be implemented in hardware or software running on appropriate hardware, such as, for example, the Dell™ PowerEdge 1750 Intel Xeon systems, or a combination of the two. In one embodiment, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program may be implemented in a high level procedural or object oriented programming language such as Java, to communicate with a computer system, however, the programs can be implemented in assembly or machine language, if desired. In any case, the language may be a compiled or interpreted language.

Each such computer program may be stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method for determining and delivering appropriate content to a personal data communication device, comprising:
   receiving a message containing content having a content type from said personal data communication device;
   determining and associating a device capability with said personal data communication device based on a previous communication with said personal data communication device;
   establishing, based on the success or failure of the previous communication, if the content type is supported by said device capability;
   transforming the content having the content type into a format supported by said personal data communication device based on said associated device capability; and
   forwarding said transformed content to said personal data communication device.

2. The method as in claim 1, wherein the step of determining said device capability includes capturing device specific information.

3. The method as in claim 2 wherein said device specific information includes a network protocol utilized by said personal data communication device, a network provider utilized by said personal data communication device, a current state of said personal data communication device or user specified settings.

4. A non-transitory computer readable storage medium sorting instructions for causing a computer to:
   receive a message containing content having a content type from said personal data communication device;
   determine and associate a device capability with said personal data communication device based on a previous communication with said personal data communication device;
   establish, based on the success or failure of the previous communication, if the content type is supported by said device capability;
   transform the content having the content type into a format supported by said personal data communication device based on said associated device capability; and
   forward said transformed content to said personal data communication device.

5. The non-transitory computer readable storage medium of claim 4, wherein the instructions for causing a computer to determine said device capability includes instructions for causing a computer to capture device specific information.

6. The non-transitory computer readable storage medium of claim 5, wherein said device specific information includes a network protocol utilized by said personal data communication device, a network provider utilized by said personal data communication device, a current state of said personal data communication device or user specific settings.

7. A system for determining and delivering appropriate content to a personal data communication device, comprising:
   a delivery component configured to receive a first message containing content having a content type;
   a device capability component configured to:
      determine and associate a device capability with said personal communication device based on a pervious communication with said personal communication device;
      establish, based on the success or failure of the pervious communication, if the content type is supported by said device capability, and
      transform said content having the content type into a format supported by said personal data communication device based on said associated device capability,
   wherein said delivery component is further configured to forward said transformed content to said personal data communication device.

8. The system of claim 7, wherein the device capability component configured to determine said device capability includes the device capability component configured to capture device specific information.

9. The system of claim 8, wherein said device specific information includes a network protocol utilized by said personal data communication device, a network provider utilized by said personal data communication device, a current state of said personal data communication device or user specified settings.

* * * * *